United States Patent [19]

Mizuhara et al.

[11] Patent Number: 4,955,019
[45] Date of Patent: Sep. 4, 1990

[54] MULTIMEDIA INFORMATION EXCHANGING SYSTEM AND EQUIPMENT THEREFOR

[75] Inventors: Noboru Mizuhara, Kawasaki; Hoshi Tohru, Yokohama; Takashi Morita, Yokohama, all of Japan

[73] Assignee: Hitachi, Ltd., Tokyo, Japan

[21] Appl. No.: 427,957

[22] Filed: Oct. 25, 1989

Related U.S. Application Data

[63] Continuation of Ser. No. 150,170, Jan. 29, 1988, abandoned.

[30] Foreign Application Priority Data

Mar. 2, 1987 [JP] Japan .................................. 62-63994

[51] Int. Cl.$^5$ ............................................... H04J 3/02
[52] U.S. Cl. .................................... 370/85.7; 370/85.9
[58] Field of Search ...................... 370/67, 85.2, 85.7, 370/85.9, 65.4, 55.1; 380/825.5

[56] References Cited

U.S. PATENT DOCUMENTS

| | | | |
|---|---|---|---|
| 4,340,961 | 7/1982 | Capel et al. | 370/96 |
| 4,603,418 | 7/1986 | Townsend | 370/96 |
| 4,608,685 | 8/1986 | Sain et al. | 370/85.9 |
| 4,672,604 | 6/1987 | Burtin et al. | 370/85.9 |
| 4,680,753 | 7/1987 | Fulton et al. | 370/85.9 |
| 4,740,957 | 4/1988 | Cassidy et al. | 370/96 |

Primary Examiner—Joseph A. Orsino
Assistant Examiner—Frank M. Scutch, III
Attorney, Agent, or Firm—Pennie & Edmonds

[57] ABSTRACT

A multimedia information exchanging system in a digital exchange network that has an exchange system in which channels are selectively assigned for communication among a plurality of subscribers. This system has many pieces of subscriber line terminating equipment each of which is provided on the subscriber side of each subscriber line and which connects at least one terminal device to the subscriber line through subchannels. The system permits simultaneous multiple communications between multiple pairs of terminal devices by sending request information from a first piece of subscriber line terminating equipment to a second piece of subscriber line terminating equipment—the request information calling for at least one of the subchannels available for use in a channel established between the two pieces of subcriber line terminating equipment—and by connecting the subchannels conforming to the request to one of the terminal devices accommodated in each of the first and second pieces of subscriber line terminating equipment.

21 Claims, 4 Drawing Sheets

FIG. 2

| 1 | 1 | 1 | 1 | 0 | 0 | 1 | 1 |
|---|---|---|---|---|---|---|---|
| 8 | 7 | 6 | 5 | 4 | 3 | 2 | 1 bit |

20 SUBCHANNEL MANAGEMENT TABLE

FIG. 3

30 TERMINAL MANAGEMENT TABLE

|     | BIT RATE | ASSIGNED BIT | MEDIA | MODE |
|-----|----------|--------------|-------|------|
| TE1 | 64K | 0 0 0 0 0 0 0 0 | VOICE |  |
| TE2 | 32K | 1 1 1 1 0 0 0 0 | VOICE |  |
| TE3 | 32K | 0 0 0 0 0 0 0 0 | DATA | SYNCHRONOUS |
| TE4 | 8K | 0 0 0 0 0 0 1 0 | DATA | SYNCHRONOUS |
| TE5 | 8K | 0 0 0 0 0 0 0 1 | DATA | ASYNCHRONOUS |

| SETUP | DESTINATION ADDRESS | USER'S CALL CONTROL SIGNAL (43) |||| |
|---|---|---|---|---|---|
|  |  | SETUP | BIT INDICATOR | MEDIA | MODE |
| 41 | 42 | 44 | 45 | 46 | 47 |

40 CALL CONTROL SIGNAL

FIG. 5

| USER'S CALL CONTROL SIGNAL | SETUP | BIT INDICATOR | MEDIA | MODE |
|---|---|---|---|---|
| 51 | 52 ||||

50 USER'S CALL CONTROL SIGNAL

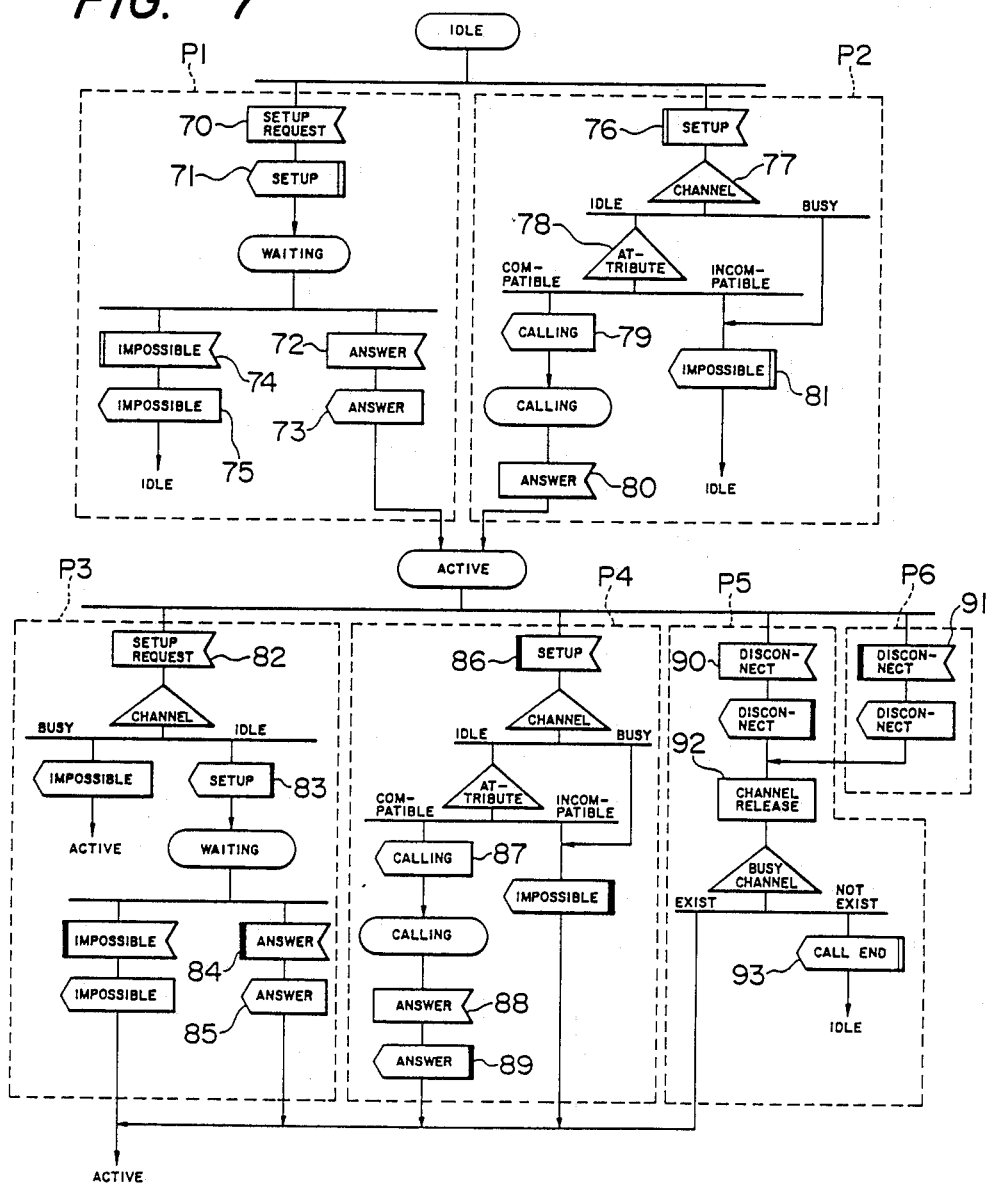
FIG. 7
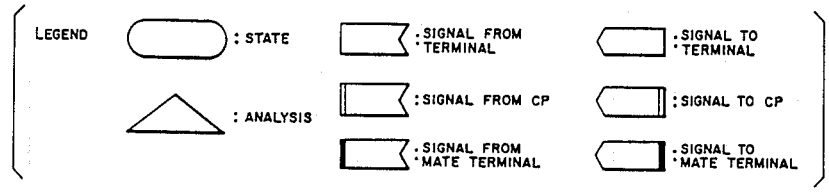

MULTIMEDIA INFORMATION EXCHANGING SYSTEM AND EQUIPMENT THEREFOR

This is a continuation of application Ser. No. 150,170, filed Jan. 29, 1988, now abandoned.

BACKGROUND OF THE INVENTION

1. Field of the Invention

The present invention relates to communications through a digital exchange network and more particularly to an information exchange control on multimedia communication carried out through a digital exchange network between a pair of subscribers using multiple pairs of terminal devices.

2. Description of the Prior Art

In the digital exchange network, each subscriber line is usually connected with a terminal device (hereafter referred to simply as a terminal) through a terminating equipment. The type of the terminating equipment varies depending on the data transmission rate of the terminal. The exchange system allocates to each terminal a predetermined time slot which corresponds to the terminal's accommodated location in the exchange system.

The Japanese Patent Laid-Open No. 33763/1985 discloses an improvement in which the number of time slots allocated to each terminal is dynamically controlled. In this method, the terminal specifies the transmission rate class through a control channel for example and the exchange system searches vacant time slots in a number corresponding to the specified transmission rate class and allocates them to the requesting terminal. This method permits a plurality of terminals with different transmission rates to be connected to terminating equipment through a switching circuit so that any one of these terminals can be used for communication. This method, however, does not consider multimedia communication in which a pair of subscribers exchanges information by simultaneously using two or more terminals accommodated in a single piece of terminating equipment. The I Series Recommendation (1985) of CCITT stipulates standards for the exchange system in performing exchange controls at the subchannel level. The above multimedia communication is considered feasible by using the exchange control at the subchannel level.

In realizing the above-mentioned subchannel exchange control on the exchange system side, there are two possible methods. The first method is that during the exchange process a call using the subchannel, too, is first assigned to the entire channel of the exchange data unit (say, 64 Kbps) and then returned to the original subchannel. The second method uses many subchannel switches provided in the channel. The first method, however, results in a large-scaled switching system which is poor in using efficiency. The second method also has the disadvantage of a complex switching system configuration.

SUMMARY OF THE INVENTION

The object of this invention is to make possible multimedia communication between a pair of subscribers without changing the configuration, scale and the like of the switching system in the existing digital exchange system. For this purpose, this invention provides a multimedia information exchanging system in a digital exchange network that has an exchange system in which channels are selectively assigned for communication among a plurality of subscribers. The multimedia information exchanging system of this invention has many pieces of subscriber line terminating equipment each of which is provided on the subscriber side of each subscriber line and which connects at least one terminal device to the subscriber line through subchannels. This system is also characterized by its ability to make simultaneous multiple communications between multiple pairs of terminal devices by sending a request information from a first piece of subscriber line terminating equipment to a second piece of subscriber line terminating equipment, the request information calling for at least one of the subchannels available for use in a channel established between the two pieces of subscriber line terminating equipment, and by connecting the subchannels conforming to the request to one of the terminal devices accommodated in each of the first and second pieces of subscriber line terminating equipment.

BRIEF DESCRIPTION OF THE DRAWINGS

FIG. 2 is a diagram showing one example of a subchannel management table used in the embodiments of the invention;

FIG. 3 is a diagram showing one example of a terminal management table used in the above embodiment;

FIGS. 4 and 5 is a diagram showing the formats of two kinds of call control signals used in the above embodiment;

FIG. 7 is a flowchart showing the control action of the control circuit (CNT) shown in FIG. 1.

DETAILED DESCRIPTION OF THE PREFERRED EMBODIMENTS

The foregoing and other objects, advantages, manner of operation and novel features of the present invention will be understood from the following detailed description when read in connection with the accompanying drawings.

According to the invention, at any given time when a subscriber is making either a call to or communication a talk with another subscriber on the other end of the line, it is possible for the first subscriber to notify the latter which subchannels or subchannel groups he is going to use for communication. The subscriber on the remote side connects the specified subchannels or subchannel groups to appropriate terminals and this allows multiple communications to be carried out simultaneously between the pair of these subscribers. The exchange system need not perform the exchange control on the subchannels and can process the multimedia information exchange as a single call.

The subscriber line terminating equipment, of this invention on the other hand, transfers the specification information on the subchannels or subchannel groups between pieces of subscriber line terminating equipment and connects the subchannels or subchannel groups to the terminals.

Figure 1:
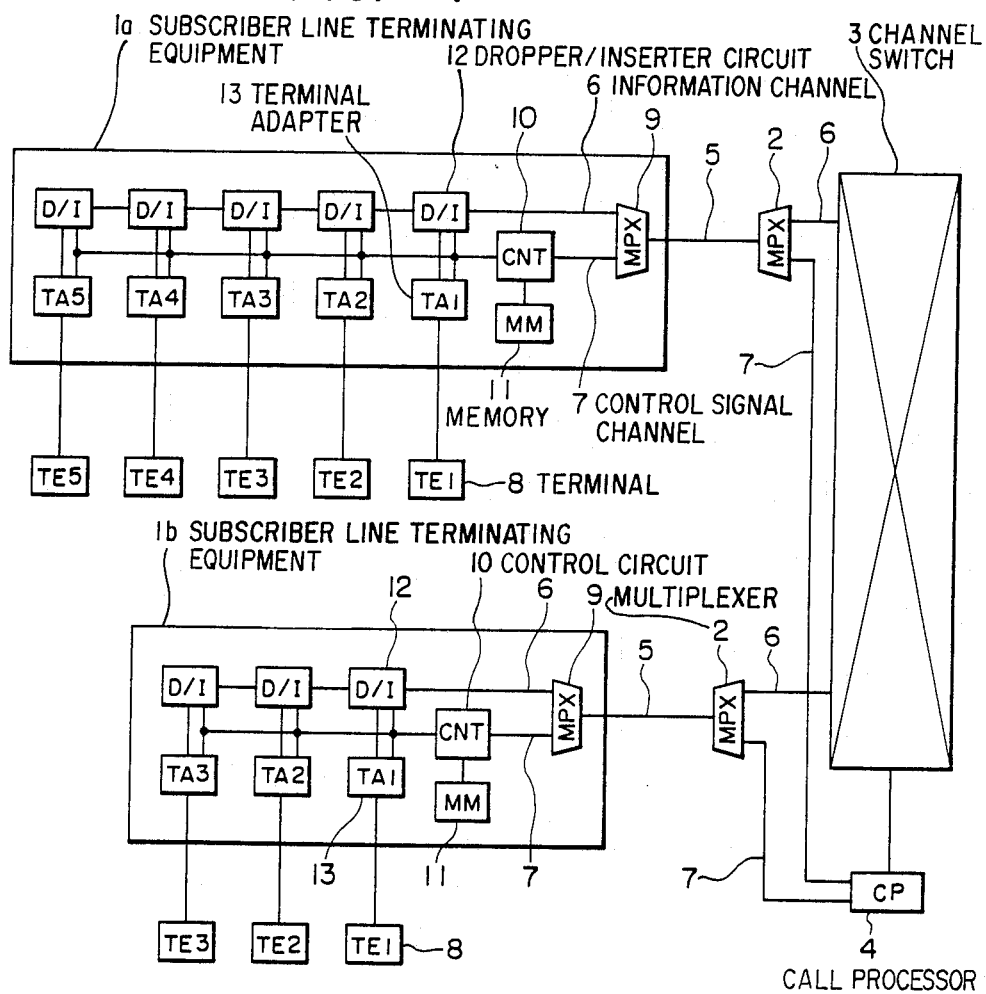
FIG. 1 is a block diagram showing one example of digital exchange network to which this invention is applied.

FIG. 1 shows an example of the digital exchange network to which the multimedia information exchanging system of this invention is applied. FIG. 1 also illustrates one embodiment of the subscriber line terminating equipment according to the invention. The digital exchange network consists of pieces of subscriber line terminating equipment 1a, 1b, multiplexing/demultiplexing circuits (MPX) 2, a channel switch 3, a call processor (CP) 4, and digital subscriber lines 5. Although only two pieces of subscriber line terminating equipment are shown, the real system has many pieces of subscriber line terminating equipment. This exchange network employs the outchannel scheme and therefore an information channel 6 and a call control signal channel 7 are provided separately. The multiplexing/demultiplexing circuit 2 multiplexes the information channel 6 and the call control signal channel 7 from the exchange system side through time division and sends the multiplexed signal on the digital subscriber line 5. It also demultiplexes the multiplexed signal on the digital subscriber line 5 into the information channel 6 and the call control signal channel 7 for transfer to the exchange system. The call processor 4, in response to a signal on the call control signal channel 7, controls the channel switch 3 to set up an information channel between the pair of digital subscriber lines 5. The call processor 4 also sends various control signals to the pieces of subscriber line terminating equipment 1a, 1b through the call control signal channel 7 and, as described later, transfers at least a part of the call control signal from each piece of subscriber line terminating equipment to the other piece of subscriber line terminating equipment through the call control signal channel 7.

Pieces of subscriber line terminating equipment 1a, 1b each connect their digital subscriber lines 5 to a plurality of terminals (TE) 8. In the example shown, a piece of subscriber line terminating equipment 1a accommodates five terminals TE1 through TE5 and the other piece of subscriber line terminating equipment 1b accommodates three terminals TE1 through TE3. Each piece of subscriber line terminating equipment consists of a multiplexing/demultiplexing circuit (MPX) 9 similar to the circuit 2, a control circuit (CNT) 10 connected to the call control signal channel 7, a memory (MM) 11 used by the control circuit 10, dropper/inserter circuits (D/I) 12 in numbers equal to the accommodated terminals 8, connected to the information channel 6, and terminal adapters (TA) 13 connected between each dropper/inserter circuit 12 and each terminal 8. The dropper/inserter circuit 12 divides the information channel 6 into subchannels which are connected to the terminals 8, and the terminal adapter 13 makes the transmission rates (bit rate) of the terminal and the subchannel match each other. The control circuit 10 is realized by microcomputer. In making and receiving a call, the circuit 10 connects the call control signal through the call control signal channel 7 to the call processor 4 and communicates through the call processor 4 with the other piece of subscriber terminating equipment. The control circuit 10 also supplies the control signal to the dropper/inserter circuit 12 and the terminal adapter 13 to establish a selective connection between the subchannel and a desired terminal.

The control circuit 10 refers to and updates the subchannel management table and the terminal management table contained in the memory 11 for executing the control. FIG. 2 shows one example of the subchannel management table. In this embodiment, the transmission rate of the information channel 6 is 64 Kbps and one time slot has eight bit positions. Thus, one bit position provides 8 Kbps of subchannel. The subchannel management table 20 consists of eight bits and each bit corresponds to one bit position in the time slot, that is, to one subchannel. The value "1" and "0" in the bit position means "busy" and "idle" respectively. The control circuit 10 refers to the subchannel management table 20 when making or receiving a channel setup request to decide whether or not the subchannel is available for connection. It then sets to "1" the bit corresponding to the subchannel that is to be used. In terminating the communication, the control circuit 10 resets to "0" the bit corresponding to the cleared subchannel.

FIG. 3 shows one example of the terminal management table. For each of the accommodated terminals 8, the terminal management table 30 has a bit rate field 31 indicating the transmission rate, an assigned bit field 32 showing the bit position or subchannel being used by the terminal, a media field 33 showing the kind of information handled by the terminal, and a mode field 34 signifying the transmission mode when the media is data. In addition to the information specifying synchronous/asynchronous which is shown in the figure, the mode field 34 also retains information specifying full duplex or half duplex and other transmission modes that require specific identification. The example shown is a terminal management table at a piece of subscriber line terminating equipment 1a and retains the aforementioned information for each of the five terminals TE1 to TE5. The assigned bit field 32 shows that TE1 and TE3 are not used; TE2 is currently using the fifth to eighth bit positions; and TE4 and TE5 are now using the second and the first bit position respectively.

FIG. 4 shows one example of the call control signal which is issued by the caller's piece of subscriber line terminating equipment at time of making the first channel setup request, i.e., when the information channel to a destination piece of subscriber line terminating equipment is not yet established. The call control signal 40 has in the control signal category field a code 41 signifying the channel setup request. It also includes destination address 42 and user's call control information 43. The destination address 42 is used by the call processor 4 to establish the information channel between the caller's piece of subscriber line terminating equipment and the destination piece of subscriber line terminating equipment. The user's call control information 43 is that part of the call control signal 40 which is transferred to the destination piece of subscriber line terminating equipment via the call processor 4 and contains a channel setup request code 44 as the control signal category, a bit indicator 45 signifying the bit position in the time slot or subchannel to be used, and media 46 and mode 47 of the terminal to be used.

FIG. 5 shows one example of the user's call control signal that is sent out when an additional communication is to be initiated between a pair of pieces of subscriber line terminating equipment which already have an assigned information channel. The user's call control signal 50 contains a user's call control signal code 51 and a field of the same configuration as the user's call control information 43 of FIG. 4. The call processor 4 relays the user's call control signal 50 to the destination piece of subscriber line terminating equipment.

Figure 6A:
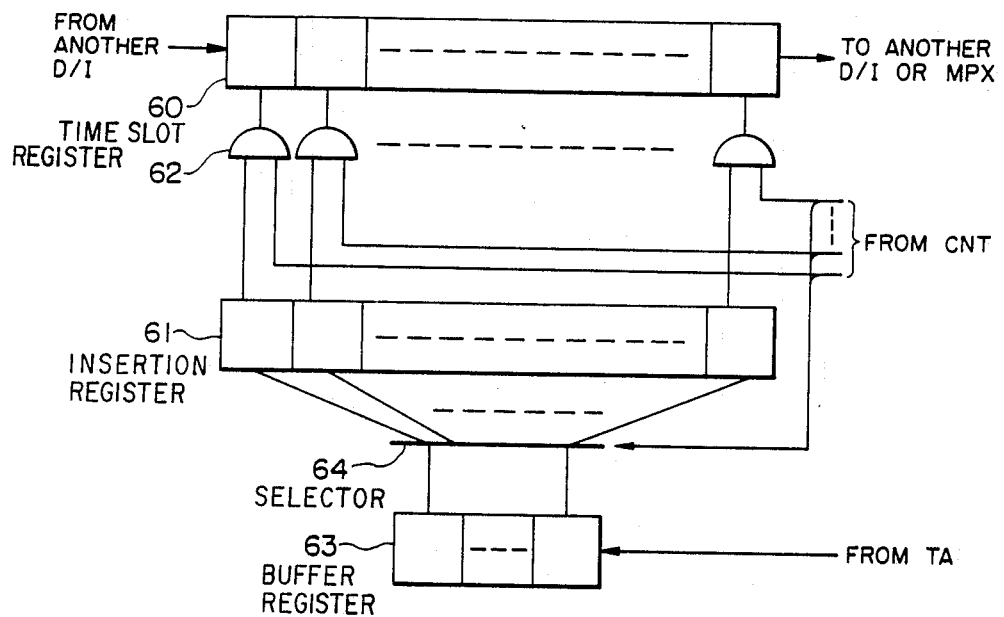
FIGS. 6(a) and 6(b) are block diagrams showing the detail of a dropper/inserter circuit (D/I) as shown in FIG. 1.
Figure 6B:
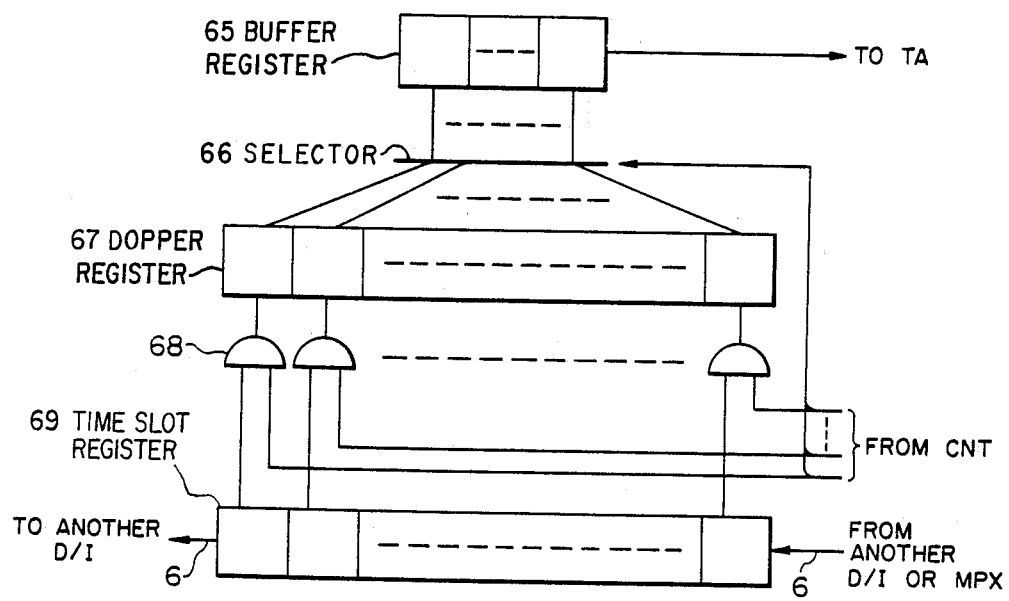

FIGS. 6(a) and 6(b) show the details of one example of the dropper/inserter circuit 12. (a) illustrates a part of the circuit, or subchannel inserter, that inserts the data from the terminal to the specified bit position in the time slot, i.e., to the specified subchannel. (b) represents a subchannel dropper part that separates data in the subchannel corresponding to the specified bit position and send it to the terminal. In the subchannel inserter shown in FIG. 6(a), the time slot register 60 is a 8-bit register with each bit position corresponding to the time slot's bit position. The insertion register 61 has bit positions corresponding to the bit positions of the time slot register 60 and the output of each bit position is transferred to the corresponding bit position of the time slot register 60 through an AND gate 62 which receives at the second input a bit position designating signal from the control circuit (CNT) 10. The buffer register 63 is connected to the output of the terminal adapter 13 and has a bit position corresponding to the transmission rate of the connected terminal. For example, for the terminal with the transmission rate of 8 Kbps, a buffer register with a 1-bit position is used and for the terminal with 32 Kbps a register with a 4-bit position is used. The contents of the buffer register 63 are transferred to the specified bit position of the insertion register 61 by a selector 64 which is controlled by the bit position designating signal from the control circuit (CNT) 10. The contents of the insertion register 61 are transferred to the time slot register 60 from which they are transferred to one time slot register after another of the succeeding dropper/inserter circuits 12 in order to be inserted as part of the data to be transmitted. And the final data is sent to the multiplexing/ demultiplexing circuit 9.

The subchannel dropper shown in FIG. 6(b) consists of a buffer register 65, a selector 66, a dropper register 67, a group of AND gates 68, and a time slot register 69. In a sequence reverse to that of FIG. 6(a), the contents in the specified bit position of the time slot register 69 are extracted through the AND gate 68 into the dropper register 67, from which they are collected to the buffer register 65 by the selector 66 and then sent out to the terminal adapter 13.

FIG. 7 shows the flow of control action performed by the control circuit 10 in the subscriber line terminating equipment. This is illustrated by a status transition description method SDL (Specification Description Language) adopted by the CCITT recommendation. Processing P1 is the one which is carried out when the control circuit 10 receives the channel setup request from one of the terminals when the circuit 10 is idle. In response to the setup request 70, the control circuit 10 refers to the terminal management table of FIG. 3 to check the attribute of the calling terminal. It then reads the subchannel management table of FIG. 2 and sets the required bit positions to "1" in the table to secure the required subchannels. Next, the control circuit 10 generates a call control signal 71 of a format as shown in FIG. 4 and sends it to the call processor 4 and then waits for a response. When it receives a response signal 72, the control circuit 10 sends a response signal 73 to the calling terminal and starts sending the required control signal to the dropper/inserter circuit 12 and the terminal adapter 13 both connected to the calling terminal and then shifts to the active state. At this time, an information channel of 64 Kbps is set in the exchange system irrespective of the transmission rate of the subchannel to be used. When, however, a connection-not-possible signal 74 is received because the destination is busy or the attribute is incompatible, the control circuit 10 resets the bits in the subchannel management table that were previously set to "1" and clears the corresponding subchannels. It then sends the connection-not-possible signal 75 to the calling terminal before returning to the idle state.

Processing P2 shows the flow of control actions performed when the control circuit 10 during the idle state receives a channel setup request. The channel setup request signal received 76 contains the user's call control information 43 of the call control signal shown in FIG. 4. The control circuit 10 refers to the subchannel management table to check if the specified subchannel is idle or not (77). If the specified subchannel is available for use, the control circuit 10 refers to the terminal management table to check the presence of a terminal that has the specified attribute (78). If a compatible terminal is present, it is called up (79). Upon reception of a response 80 from the called terminal, the control circuit 10 enters the active state. At this time, the control circuit 10 sets to "1" the corresponding bits in the subchannel management table and the corresponding assigned bits 32 in the terminal management table. At the same time it also starts supplying the control signal to an associated dropper/inserter circuit 12 and the terminal adapter 13. When, however, the specified subchannel is busy or a terminal with the specified attribute is not available, the control circuit 10 notifies the call processor 4 to this effect (81) before returning to the idle state.

Processing P3 represents the control action performed when a channel setup request is made by the other terminal while the control circuit 10 is in the active state. In response to the channel setup request 82, the control circuit 10 refers to the terminal management table and the subchannel management table and, if the required subchannel is idle, secures it and sends the user's call control signal of a format as shown in FIG. 5 to the destination piece of subscriber line terminating equipment (83). After this, when a response 84 from the other subscriber comes, the control circuit 10 returns the response 85 to the calling terminal, connects the terminal to the specified subchannel and keeps its active state.

Processing 4 shows the control action performed when the control circuit during the active state receives a user's call control signal. According to the channel setup request received 86, the control circuit 10 calls the corresponding terminal if the specified subchannel is available and if the attribute of the available terminal compatible with the specified attribute (87). When a response 88 to the call is received, the circuit 10 connects the terminal to the specified subchannel. Then, it sends a response to the destination piece of subscriber line terminating equipment and keeps its active state.

Processing P5 is the control action performed when the control circuit 10 receives a channel clearing request 90 from a terminal. Processing P6 is the control action performed when the control circuit 10 receives a channel clearing request 91 from the other piece of subscriber line terminating equipment. Upon reception of the channel clearing request, the control circuit 10 informs the other piece of subscriber line terminating equipment or its own terminal of the disconnection, resets the corresponding assigned bit in the terminal management table and the corresponding bit in the subchannel management table, and stops supplying the control signal to the corresponding dropper/ inserter circuit 12 and the terminal adapter 13 to clear the associated subchannel (92). When as a result all the subchannel becomes idle, the control circuit 10 notifies the call processor 4 of the termination of communication 93. If there is any subchannel remaining connected, the circuit 10 maintains the active state.

In the above embodiment, this invention is applied to the exchange network which has a call control signal channel in addition to the information channel. The invention is also applicable to the exchange network with no call control signal channel, by assigning a part of the information channel for the user's call control signal. Where the subscriber line carries a plurality of information channels, this invention can be applied to each information channel that is defined by the multiplexing/demultiplexing device.

The dropping and insertion of subchannels can be done in a variety of ways and the above embodiment permits free assignment and modification of subchannels with simple circuits.

With this invention the subscriber can divide the information channel which is handled as a single call by the exchange system into an appropriate number of subchannels in order to exchange multimedia information, without having to alter the functions of the exchange system. Assignment and modification of the subchannels can easily be performed by the subscriber as necessary.

We claim:

1. A method of exchanging information in a digital network having a plurality of subscriber lines, a plurality of subscriber line terminating equipments connected to said subscriber lines at the subscriber side to accommodate a plurality of terminal devices, respectively, and an exchange system to which said subscriber lines are connected, for selectively establishing a channel between two of said subscriber line terminating equipments, said channel being divided into a plurality of subchannels for parallel communication among a plurality of pairs of terminal devices accommodated in two of said subscriber line terminating equipments, comprising the steps of:

sending a call setup information from a first one of said subscriber line terminating equipments to the other one according to a request from a first terminal device accommodated in said first one of said subscriber line terminating equipments, said call setup information indicating at least one of the subchannels available for use in said channel established between two of said subscriber line terminating equipments; and connecting said subchannel indicated by said call setup information to said first terminal device and a second terminal device accommodated in the other one of two of said subscriber line terminating equipments by means of the control operation of two of said subscriber line terminating equipments during the period which said first or second terminal device require.

2. A method of exchanging information as set forth in claim 1, wherein communications between multiple pairs of terminal devices are simultaneously executed through said subchannels in a channel.

3. A method of exchanging information as set forth in claim 1, wherein bit position in a channel constitute the subchannels.

4. A method of exchanging information as set forth in claim 1, wherein the subscriber lines each accommodate at least one of said channel and a call control signal channel for transmitting call control signals between said exchange system and said subscriber line terminating equipment; said exchange system can transmit at least a part of a call control signal on said call control signal channel between two of the subscriber line terminating equipments, and said call setup information is transmitted included in said part of call control signal channel, when a terminal device request said subscriber line terminating equipment to setup a call and use subchannels.

5. A method of exchanging multimedia information as set forth in claim 1, further comprising the step of updating management information which shows a state of use of said subchannels and the terminal devices accommodated in each of the first and second subscriber line terminating equipments.

6. A subscriber line terminating equipment provided between a plurality of terminal devices and a digital subscriber line of the digital exchange network for exchanging said subscriber line, comprising:

subchannel connecting means dividing the channel in the subscriber line into a plurality of subchannels and connecting at least one specified one of said subchannels to a specified one of said terminal devices; and means to supply a signal which specifies subchannels to said subchannel connecting means according to the request of communication with another terminal device which is connected to another subscriber line terminating equipment; and means for connecting said subchannel connecting means in the exchanged subscriber line to said subchannel conforming to said request.

7. A subscriber line terminating equipment as set forth in claim 6, further comprising:

means to send a call setup information containing a subchannel indication information of a call control signal channel in said subscriber line; and control means to receive another call setup information which is received from another subscriber line terminating equipment through said subscriber line and specify a subchannel conforming to said another call setup information.

8. A subscriber line terminating equipment as set forth in claim 6, wherein the subchannels correspond to the bit position in the channel and the subchannel connecting means consists of a means to extract received data or voice from subchannel corresponding to the indicated bit position information in a call setup information which is already received through a call control signal channel and feed it to the terminal device specified in said call setup information and a means to insert transmitting data or voice from the terminal device into said indicated bit position.

9. A subscriber line terminating equipment as set forth in claim 6, wherein the subscriber line accommodates at least one said channel and a call control signal channel, said exchange network can transfer at least a part of the call control signal on the call control signal channel to another subscriber line terminating equipment, and said control means sends and receives the call setup information through said call control signal channel.

10. Subscriber line terminating equipment as set forth in claim 6, wherein the control means further manages information showing the status of use of said subchannels and the terminal devices and refers to this information to select a subchannel to be used.

11. A multimedia information exchanging system in a digital exchange network with an exchange system in which channels in subscriber lines are switched for communication among a plurality of subscribers, comprising:

subscriber line terminating equipments each of which is connected to the subscriber side of the respective subscriber line and which connects a plurality of terminal devices to said channels in the subscriber line through subchannels;

means to send a call setup information from a first subscriber line terminating equipment to a second subscriber line terminating equipment;

means for sending a request information according to a request from a terminal device connected to said subscriber line terminating equipment, said request information indicating at least one of the subchannels available for use in a channel switched between said first and second subscriber line terminating equipments through said exchange system; and means in said subscriber line terminating equipments for connecting the subchannels in said switched channel conforming to said request.

12. A method of exchanging multimedia information in a digital network having a plurality of subscriber lines, a plurality of subscriber line terminating equipments connected to said subscriber lines at the subscriber side to accommodate a plurality of terminal devices, respectively, at least one of said terminal devices using a medium different from that of another terminal device, and an exchange system to which said subscriber lines are connected, for selectively establishing a channel between two of said subscriber line terminating equipments, said channel being divided into a plurality of subchannels for parallel communication among a plurality of pairs of terminal devices accommodated in two of said subscriber line terminating equipments, comprising the steps of:

sending a call setup information from a first one of said two subscriber line terminating equipments to the other one according to a request from a first terminal device accommodated in said first one of said subscriber line terminating equipments, said call setup information indicating at least one of the subchannels available for use in said channel established between two of said subscriber line terminating equipments, and indicating a medium to be used in the available subchannels; and connecting said subchannel indicated by said call setup information to said first terminal device and a second terminal device accommodated in the other one of two said subscriber line terminating equipments by means of the control operation or two of said subscriber line terminating equipments, during the period which said first or second terminal device requires.

13. A method of exchanging multimedia information as set forth in claim 12, wherein communications between said plurality of pairs of terminal devices are simultaneously executed through said subchannels in a channel.

14. A method of exchanging multimedia information as set forth in claim 12, wherein bit positions in a channel constitute the subchannels.

15. A method of exchanging multimedia information as set forth in claim 12, wherein each of said subscriber lines accommodates at least one information channel for transmitting said multimedia information and at least one control signal channel for transmitting control signals, said exchange system operates to transmit the control signals through said control signal channel between two of the subscriber line terminating equipments, and said call setup information is sent out onto said control signal channel by one of said two subscriber line terminating equipments when a terminal device request said subscriber line terminating equipment to setup a call or use subchannels.

16. A multimedia information exchanging system in a digital exchange network comprising:

a plurality of subscriber lines for forming an information channel and a control channel thereon, respectively;

a plurality of terminating equipments connected to said subscriber lines at the subscriber side to accommodate a plurality of terminal devices, respectively; and a switch means, to which said subscriber lines are connected, for selectively establishing said information channel between two of said terminating equipments, said information channel including a plurality of subchannels available for a plurality of simultaneous communications;

each of said terminating equipments having:

a control means connected to the subscriber line for transmitting, through a control channel on said subscriber line, a call control signal to request said switch means to establish an information channel between the terminating equipment and another one of said plurality of terminating equipments and to inform said another one terminating equipment of information of subchannel designation when a first one of terminal devices under the terminating equipment requests to communicate with a second one of terminal devices connected to said another one terminating equipment if the information channel has not been established and for transmitting a user call control signal to said control channel to inform said another one terminating equipment of information of subchannel designation if said information channel has been established;

a connection means controlled by said control means for coupling said first terminal device with at least one idle subchannel in said information channel after said information channel has been established and for coupling one of said terminal devices under the terminating equipment with at least one idle subchannel when a user call control signal from said another one terminating equipment has been received by said control means, said idle subchannel being selected in accordance with said information of subchannel designation.

17. A method of communicating information in a digital network having a plurality of subscriber lines, a plurality of subscriber line terminating equipments connected to said subscriber lines at the subscriber side to accommodate a plurality of terminal devices respectively, and a switching means, to which each of said subscriber line terminating equipments is connected through a control channel formed on the subscriber line, for establishing an information channel between two of said subscriber line terminating equipments, said information channel having a plurality of subchannels, said method comprising the steps of:

sending a call control signal from one of said two subscriber line terminating equipments to said switching means through the control channel to establish an information channel between said one subscriber line terminating equipment and the other one of two said subscriber line terminating equipments;

sending a user call control signal from said one subscriber line terminating equipment to said other one subscriber line terminating equipment through said control channel to inform of at least one subchannel for use in communication between a first one of terminal devices under said one subscriber line terminating equipment and a second one of terminal devices under said other one subscriber line terminating equipment if said first terminal device requests said communication after said information channel has been established; and coupling at least one idle subchannel indicated in said user call control signal with said first terminal device and said second terminal device at two of said subscriber line terminating equipments, respectively.

18. A method of exchanging information in a digital network having a plurality of subscriber lines, a channel switch for exchanging said subscriber lines to establish channels, and a plurality of subscriber line terminating equipments connected respectively to said subscriber lines at the subscriber side to accommodate a plurality of terminal devices, through a plurality of subchannels comprising each of said channels, said method comprising the steps of:

sending from one of the subscriber line terminating equipments a first control information indicating at least a destination address, to said channel switch, for selectively establishing a channel with a subscriber line terminating equipment corresponding to said destination address;

sending a second control information indicating at least one of the subchannels to be used, from one of the subscriber line terminating equipments of the established channel to the other one of the subscriber line terminating equipments through said established channel, for communicating between a first terminal device connected to said one of the subscriber line terminating equipments of the established channel and a second terminal device connected to said other one of the subscriber line terminating equipments, when said first terminal device request said communication after said information channel has been established; and connecting at least one idle subchannel indicated in said second control information with said second terminal device, thereby establishing a communication route between said first terminal device and said second terminal device through said established channel.

19. A method of exchanging multimedia information in a digital network having a plurality of subscriber lines, a channel switch for exchanging said subscriber lines to establish channels, and a plurality of subscriber line terminating equipments connected respectively to said subscriber lines at the subscriber side to accommodate a plurality of terminal devices, through a plurality of subchannels comprising each of said channels, at least one of said terminal devices using a medium different from that of another terminal device, said method comprising the steps of:

sending from one of the subscriber line terminating equipments a first control information indicating at least a destination address, to said channel switch, for selectively establishing a channel with a subscriber line terminating equipment corresponding to said destination address;

sending a second control information indicating at least one of the subchannels to be used, and indicating a medium to be used in said subchannel to be used, from one of the subscriber line terminating equipments of the established channel to the other one of the subscriber line terminating equipments through said established channel, for communicating between a first terminal device connected to said one of the subscriber line terminating equipments of the established channel and a second terminal device connected to said other one of the subscriber line terminating equipments, when said first terminal device request said communication after said information channel has been established; and connecting at least one idle subchannel indicated in said second control information with said second terminal device, thereby establishing a communication route between said first terminal device and said second terminal device through said established channel.

20. A method of exchanging information in a digital network as set forth in claim 18, wherein, said first control information and said second control information are sent through a control channel formed in said established channel.

21. A method of exchanging information in a digital network as set forth in claim 18, wherein, said first control information further indicates one of the subchannels to be used.

* * * * *